A. J. Johnson,
Evaporator.
No. 97,199. Patented Nov. 23, 1869.
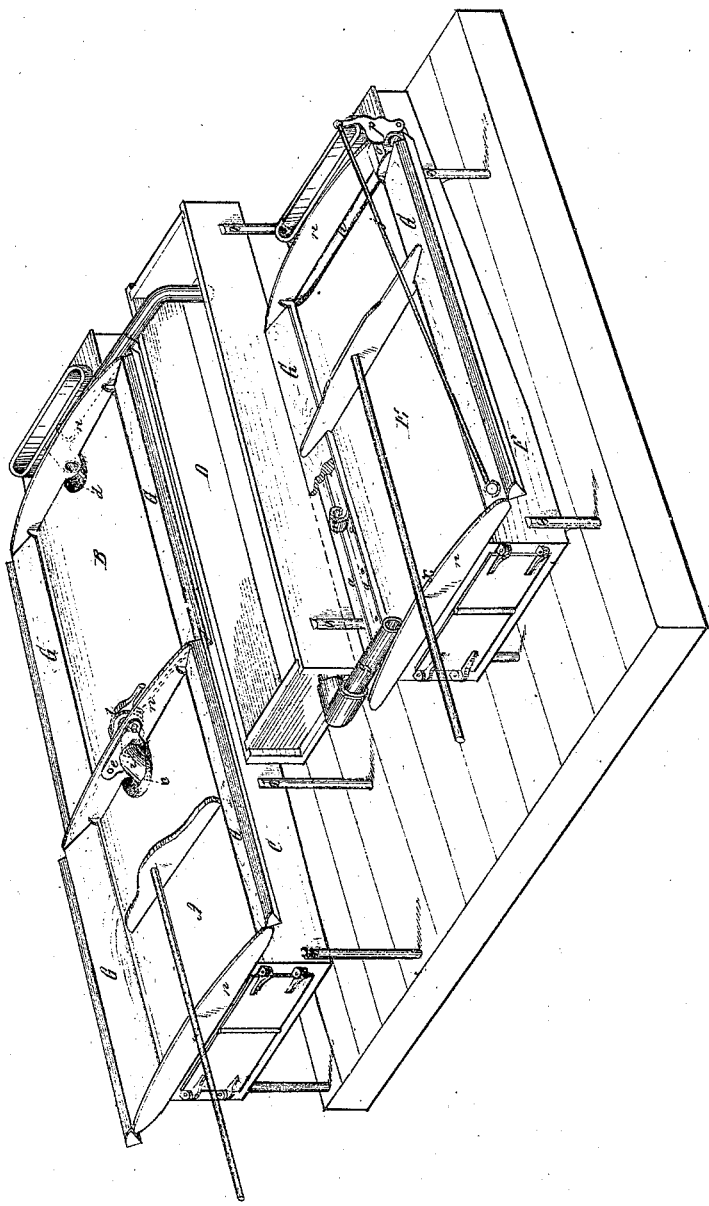
Witnesses:
Geo. W. Rothwell
Henry J. Street
Inventor.
Alfred J. Johnson

United States Patent Office.

ALFRED J. JOHNSON, OF LOUISVILLE, KENTUCKY, ASSIGNOR OF ONE HALF OF HIS RIGHT TO JAMES WILHELM, OF SAME PLACE.

Letters Patent No. 97,199, dated November 23, 1869.

IMPROVED EVAPORATING-PAN FOR SORGHUM-JUICE.

The Schedule referred to in these Letters Patent and making part of the same.

*To all whom it may concern:*

Be it known that I, ALFRED J. JOHNSON, of Louisville, in the county of Jefferson, and State of Kentucky, have invented certain new and useful Improvements in Sugar-Evaporators; and I do hereby declare the following to be a full, clear, and exact description thereof, sufficient to enable those skilled in the art to which my invention appertains, to fully understand and to make and use the same, reference being had to the accompanying drawing, forming part of this specification, and in which my invention is represented by a perspective view.

My invention comprises the following improvements, viz: Making the bottoms of the pans of cast-iron, for a purpose to be described, and providing said bottoms with wooden sides; casting two ribs on each side of the bottom, between which the wooden sides of the pan are secured; forming depressions in the cast bottoms of the coagulating-pans, at their ends, for purposes of drainage; the provision of a gate of peculiar construction, which, sinking into the depression in the bottom of the first coagulator, causes the clarified juice to pass into the second pan, separated from the green scum which remains behind; and the construction of the finisher like the coagulators, but with a depression of different form and a peculiar discharge or outlet.

My invention will be fully understood from the following detail description.

Referring to the drawing—

A represents the first coagulator, and B, the second, both resting on top of a furnace, C.

D is the semi-sirup trough, and

E, the finishing-pan, heated by a fire in the furnace F.

It has long since been discovered, that in order to evaporate saccharine juices successfully, it was necessary to use shallow pans. Such pans have heretofore been generally made of sheet iron or copper.

The objection to these is that a perfectly-level bottom cannot be maintained, and consequently, when there is but a shallow depth of juice in the pan, portions of the bottom are uncovered and burn.

Another serious objection to such pans is, that the heat of the fire is not equalized and regulated over the whole surface of the bottom.

Cast-iron pans have been used to a very limited extent, but they were cast with vertical sides, and this has prevented their general adoption, for the reason that a line of burned matter would be formed, extending entirely around the sides at the level of the juice, and this would discolor and injure the quality of all juice thereafter boiled in the pan, until the latter has been cleaned.

I make my pans with cast-iron bottoms provided with inclined wooden sides, and so constructed and arranged as to preclude the possibility of boiling a quantity of juice exceeding a half inch in depth.

A pan, with a bottom perfectly level at all times, is thus obtained, and one which equalizes and regulates the heat by its weight or body of metal and even surface.

Juice treated in these pans cannot be burned, although its depth is less than a quarter of an inch.

These bottoms are cast with two ribs, *a a*, at each side, between which ribs are fixed the inclined wooden sides G G.

Between the bottom of the pan and the wooden sides are interposed layers of packing to prevent leakage.

*m* represents this packing laid between the ribs *a a*.

It will be seen that the ribs *a a* are so made at the ends as to extend upward on the flanges or ends *n n* of the pans, to give strength, and prevent leakage at the corners.

The ends or flanges *n n* of the pans are cast with the bottoms.

The bottoms of the pans A B are cast with depressions *c d*, respectively, for the purpose of drainage, the pans being set perfectly level.

*e* represents what may be termed a gate, made with an inverted pitcher-lip, *i*, which sinks into the depression *c* in the bottom, thus causing the juice to flow below the bottom level of the pan, before its passage into the second pan B.

The green scum being upon the surface of the juice, is prevented, by the peculiar pitcher-lip, from entering the second coagulator B.

The pans A B are secured together by means of an ordinary molasses-gate, *l*, with a straight tubular portion, which also answers as the passage through which the contents of the first pan are discharged into pan B.

Upon this tubular portion or shaft is first screwed a collar or nut, and the said shaft is then screwed into the end of pan A, on a level with the bottom of the depression *c*.

In the contiguous flange of the pan B is formed a notch, which receives the tubular portion or shaft of the gate.

The nut or collar is then screwed up against the notched flange, thus holding the adjacent flanges of the two pans in contact, and preventing leakage.

*f* represents a pipe, which enters the depression *d* in the pan B, and is swivelled in the end of said pan.

By means of this pipe, which I term a "swing-pipe," the contents of the second coagulator are discharged into the semi-sirup trough.

By adjusting this swing-pipe to the proper elevation, the contents of the coagulator may be prevented from being entirely discharged, when desired.

A similar swing-pipe, $g$, forms the communication between the semi-sirup trough and finishing-pan.

The finishing-pan is constructed like the coagulators, with this exception: the bottom is cast with a depression, $h$, extending across one end of the pan, and gradually deepening until it enters a covered channel, $o$, also cast with the bottom, and provided at its outer end with a gate, $p$, which may be operated by means of a long rod, $j$, attached to it.

In using my improved evaporator, fires are first kindled in the furnaces under the coagulating and finishing-pans.

The green juice is made to enter the pan A at the centre of the front flange, and is allowed to run in a steady stream to the opposite end of the pan, where its progress is stopped, the gates $e\ l$ being closed until sufficient coagulation takes place, and there is a depth of about a quarter of an inch of juice on the bottom.

The gate leading into pan B is then opened slightly, permitting the escape of the partially-clarified juice in a slow but steady stream, the depth of juice above stated (a quarter of an inch, more or less,) being maintained in the first pan, throughout the day, by the continuous supply of fresh juice.

As soon as sufficient coagulation has taken place, the green sum is removed over the sides of the pan into scum-troughs, as shown, or other receptacles, by means of a skimmer.

As above described, the peculiar-shaped lip on gate $e$ prevents the passage of green scum into pan B.

The partially-clarified juice is allowed to flow into the second pan until the depth attained is the same as in the first pan, the swing-pipe $f$ remaining elevated until this time.

The pipe is now depressed to such a degree as to permit the regular and continuous flow of the semi-sirup into the trough D, it being understood that only the surplus over a quarter of an inch, or thereabout, is thus permitted to escape, that depth remaining constantly in the pan, thus obtaining the continuous inflow of green juice and outflow of clarified semi-sirup at any degree of density desired.

The sirup is finished upon the finishing-pan in "batches," or "strikes," so that there may be a uniform density of sirup attained.

This pan is filled to the required depth by the depression of the swing-pipe $g$ attached to the semi-sirup trough.

When the proper density has been attained, the scraper or lute (which I prefer to provide with packing on its contact-surface) is introduced at the front end of the pan, with its handle elevated at an angle of about forty-five degrees.

The gate $p$, at the mouth of the discharge, is now opened by means of the rod $j$, and the swing-pipe $g$ is depressed so as to discharge semi-sirup into the space between the scraper and the end $x$ of the pan.

The scraper is now moved toward the discharge-end of the pan, carrying the finished sirup before it, the semi-sirup following immediately after, allowing no portion of the bottom to become exposed, and thus precluding the possibility of scorching the sirup or losing any time or heat.

The scraper is moved up to the edge of the depression $h$, which, being inclined, causes a rapid and perfect drainage.

When the finished sirup has been all discharged from the pan, the gate $p$ is closed by means of its rod, the scraper is removed from the pan, and the several operations proceed as before.

Having thus described my invention,

What I claim as new, and desire to secure by Letters Patent, is—

1. Sugar-pans, made with a cast-iron bottom and wooden sides, substantially as and for the purpose herein described.

2. The herein-described method of preventing leakage, by securing the wooden sides of the pans between ribs $a\ a$, cast with the bottom, and provided with packing, all substantially as set forth.

3. The bottoms, cast with depressions $c\ d$, and the gate, with lip $i$, sinking into the depression $c$, substantially as described, for the purpose specified.

4. The finishing-pan, constructed with the inclined depression $h$, covered channel $o$, and gate $p$, all substantially as described.

ALFRED J. JOHNSON.

Witnesses:
E. H. MAPOTHER,
E. F. HUYCK.